US010083287B2

(12) United States Patent
Kwon et al.

(10) Patent No.: US 10,083,287 B2
(45) Date of Patent: Sep. 25, 2018

(54) FINGERPRINT SENSING DEVICE AND ELECTRONIC DEVICE INCLUDING THE SAME

(71) Applicant: Samsung Electronics Co., Ltd, Suwon-si, Gyeonggi-do (KR)

(72) Inventors: Tae Hyeon Kwon, Suwon-si (KR); Kang Joo Kim, Suwon-si (KR); Yong Il Kwon, Suwon-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 169 days.

(21) Appl. No.: 15/132,346

(22) Filed: Apr. 19, 2016

(65) Prior Publication Data

US 2017/0061108 A1    Mar. 2, 2017

(30) Foreign Application Priority Data

Aug. 27, 2015    (KR) .......................... 10-2015-0121006

(51) Int. Cl.
G06F 21/32    (2013.01)
G06F 21/83    (2013.01)
(Continued)

(52) U.S. Cl.
CPC ............ G06F 21/32 (2013.01); G06F 1/1684 (2013.01); G06F 1/3215 (2013.01);
(Continued)

(58) Field of Classification Search
CPC ........ G06F 21/32; G06F 21/83; G06F 3/0416; G06F 1/3262; G06F 3/03547;
(Continued)

(56) References Cited

U.S. PATENT DOCUMENTS

2004/0234110 A1* 11/2004 Chou .................. G06K 9/0002
382/122
2005/0041841 A1*  2/2005 Yoo ....................... G06F 1/1616
382/124

(Continued)

FOREIGN PATENT DOCUMENTS

KR    10-2010-0007317 A    1/2010
KR    10-2013-0066152 A    6/2013
(Continued)

Primary Examiner — Darren B Schwartz
(74) Attorney, Agent, or Firm — F. Chau & Associates, LLC

(57) ABSTRACT

A fingerprint sensing device includes a sensing circuit configured to extract sensing data from nodes included in each of sampling regions of a sensor array. The fingerprint sensing device also includes a control circuit configured to calculate a number of the nodes based on the extracted sensing data to produce sensing data distributions for each of the sampling regions and compare the sensing data distributions with reference distributions, configured to determine that the sampling regions from which the sensing data distributions corresponding to the reference distributions are extracted are effective contact regions, and configured to generate fingerprint information from the sensor array when the number of effective contact regions is greater than or equal to a threshold.

15 Claims, 13 Drawing Sheets

(51) Int. Cl.
  *G06F 1/32* (2006.01)
  *G06F 1/16* (2006.01)
  *G06F 3/0354* (2013.01)
  *G06F 3/041* (2006.01)
  *G06K 9/03* (2006.01)
  *G06K 9/00* (2006.01)

(52) U.S. Cl.
  CPC ........ *G06F 1/3262* (2013.01); *G06F 3/03547* (2013.01); *G06F 3/0416* (2013.01); *G06F 21/83* (2013.01); *G06K 9/0002* (2013.01); *G06K 9/0008* (2013.01); *G06K 9/036* (2013.01); *G06F 2203/0338* (2013.01)

(58) Field of Classification Search
  CPC ........... G06F 1/1684; G06F 2203/0338; G06F 1/3215; G06F 9/036; G06F 9/0008; G06F 9/0002
  See application file for complete search history.

(56) References Cited

U.S. PATENT DOCUMENTS

| | | | | |
|---|---|---|---|---|
| 2007/0071286 A1* | 3/2007 | Lee | ............... | G06K 9/00892 382/115 |
| 2008/0054875 A1* | 3/2008 | Saito | ............... | A61B 5/1172 324/71.5 |
| 2010/0008552 A1 | 1/2010 | Shin et al. | | |
| 2011/0175703 A1* | 7/2011 | Benkley | ............... | G06K 9/00053 340/5.82 |
| 2012/0082348 A1* | 4/2012 | Fukuda | ............... | G06K 9/00375 382/115 |
| 2013/0136321 A1* | 5/2013 | Lee | ............... | G06K 9/0002 382/124 |
| 2013/0262356 A1* | 10/2013 | Bonastre | ............... | G06K 9/6215 706/20 |
| 2015/0070137 A1* | 3/2015 | Minteer | ............... | G06K 9/00013 340/5.83 |
| 2015/0071511 A1* | 3/2015 | Wang | ............... | G06F 1/3262 382/124 |
| 2015/0127965 A1 | 5/2015 | Hong et al. | | |
| 2016/0063300 A1* | 3/2016 | Du | ............... | G06K 9/00033 382/124 |
| 2016/0148034 A1* | 5/2016 | Kremin | ............... | G06K 9/0002 382/124 |
| 2016/0260225 A1* | 9/2016 | Thornblom | ............... | G06K 9/00087 |
| 2017/0032165 A1* | 2/2017 | Hansen | ............... | G06K 9/0002 |
| 2017/0169277 A1* | 6/2017 | Benkley | ............... | G06K 9/00026 |

FOREIGN PATENT DOCUMENTS

| | | |
|---|---|---|
| KR | 10-2015-0024807 A | 3/2015 |
| KR | 10-2015-0051888 A | 5/2015 |

\* cited by examiner

FINGERPRINT SENSING DEVICE AND ELECTRONIC DEVICE INCLUDING THE SAME

CROSS-REFERENCE TO RELATED APPLICATION

This application claims the benefit of priority under 35 USC 119(a) to Korean Patent Application No. 10-2015-0121006, filed on Aug. 27, 2015 with the Korean Intellectual Property Office, the disclosure of which is incorporated herein by reference.

BACKGROUND

1. Field

The following description relates to a fingerprint sensing device and an electronic device including the same.

2. Description of Related Art

Recently, as a result of increased developments of mobile apparatuses such as smartphones, tablet personal computers (PCs), laptop computers, and other mobile electronic apparatuses, and increased developments of Internet-of-Things (IoT) technology in which a network system is combined with mobile various electronic apparatuses, research into security-related technology has been actively conducted. In order to securely access the electronic apparatuses, existing security schemes use a password or a pattern, but the user of such password or pattern is vulnerable to hacking. In order to solve this problem, various biometric authentication devices have recently been developed.

Among the biometric authentication devices, a fingerprint sensing device may be implemented in a compact size. Therefore, the fingerprint sensing device has been used in various mobile apparatuses. In a case in which a fingerprint of a user contacts the fingerprint sensing device, the fingerprint sensing device detects an electrical signal generated by the fingerprint to generate fingerprint data and compares the generated fingerprint data with pre-stored fingerprint data to authenticate the user. Naturally, such fingerprint sensing devices consume a significant amount of power from the mobile apparatuses. Consequently, as the fingerprint sensing device has been used in the mobile apparatuses, various devices and methods to reduce power consumed in the fingerprint sensing device have been studied.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In accordance with an embodiment, there is provided a fingerprint sensing device including: a sensing circuit configured to extract sensing data from nodes included in each of sampling regions of a sensor array; and a control circuit configured to calculate a number of the nodes based on the extracted sensing data to produce sensing data distributions for each of the sampling regions and compare the sensing data distributions with reference distributions, configured to determine that the sampling regions from which the sensing data distributions corresponding to the reference distributions are extracted are effective contact regions, and configured to generate fingerprint information from the sensor array when the number of effective contact regions is greater than or equal to a threshold.

The control circuit may define separate regions in the sensor array as the sampling regions.

The control circuit may set an effective section in the sensing data distribution and may compare the sensing data distribution in the effective section with the reference distribution.

The control circuit may define a section, except for bottom 5% and top 5% in the sensing data distribution, to the effective section.

The reference distribution may be the sensing data distribution obtained in response to a fingerprint contacting the sensor array.

The control circuit may set a calculation section based on the sensing data obtained from a largest number of nodes among the nodes, and may calculate the number of sampling regions in which a ratio between the number of nodes included in the calculation section and the number of nodes included in the effective section is equal to or less than a threshold ratio.

The control circuit may generate the fingerprint information in response to the number of sampling regions in which the ratio between the number of nodes included in the calculation section and the number of nodes included in the effective section is equal to or less than the threshold ratio or is greater than a threshold number.

The control circuit may determine that the sampling regions in which the ratio between the number of nodes included in the calculation section and the number of nodes included in the effective section is greater than the threshold ratio and are regions in which a foreign material is present.

The sensing circuit and the control circuit may be provided as an integrated circuit (IC) chip.

The sensing circuit includes an integration circuit detecting may change in capacitances from the nodes to generate analog signals and an analog-to-digital converter (ADC) converting the analog signals into digital signals.

The nodes may be intersection points between first electrodes extended in a first direction and second electrodes extended in a second direction, different from the first direction.

The control circuit may generate the sensing data distribution as a histogram distribution representing the number of the nodes with respect to the sensing data.

The control circuit may generate the fingerprint information upon the number of sampling regions decided to be the effective contact regions being 60% or more of a total number of sampling regions.

In accordance with another embodiment, there is provide an electronic device, including: a sensor array configured to provide an input region to detect a fingerprint of a user; and a controller integrated circuit (IC) configured to compare sensing data distributions obtained in each of sampling regions defined in the input region with reference distributions to control an operation of a fingerprint sensor, and configured to generate fingerprint information from the input region and compare the fingerprint information with user authentication information to authenticate the user, upon the number of sampling regions in which the sensing data distributions corresponding to the reference distributions being obtained being equal to or greater than a threshold number.

The controller IC may set an effective section in the sensing data distribution obtained in each of the sampling regions and compares the sensing data distribution in the effective section with the reference distribution.

The controller IC may switch a fingerprint sensing device into a standby mode upon the number of sampling regions, in which the sensing data distributions corresponding to the reference distributions are obtained, is less than the threshold number.

Other features and aspects will be apparent from the following detailed description, the drawings, and the claims.

BRIEF DESCRIPTION OF DRAWINGS

These and/or other aspects will become apparent and more readily appreciated from the following description of the embodiments, taken in conjunction with the accompanying drawings in which.

Figure 1:
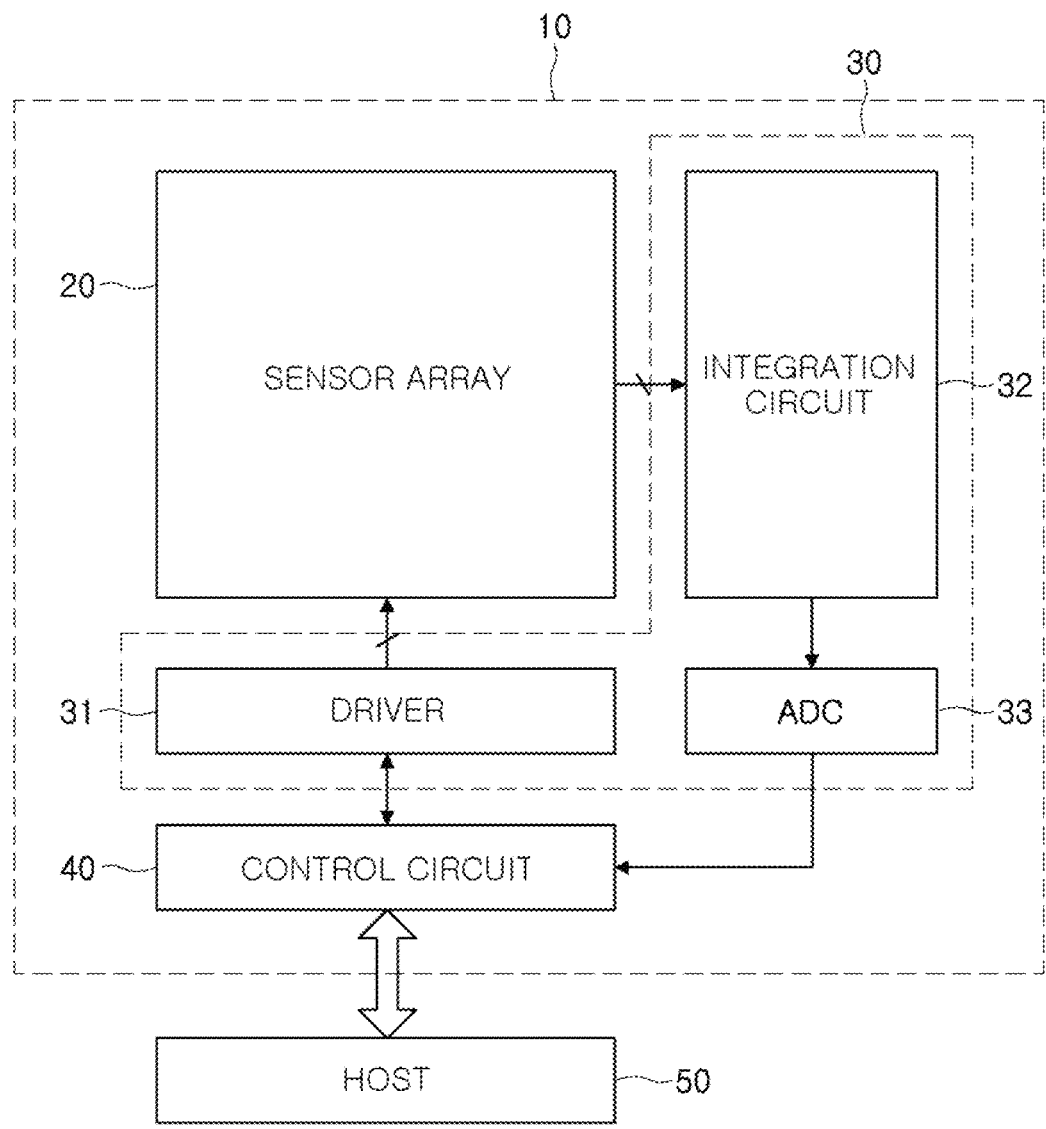
FIG. 1 is a block diagram schematically illustrating a fingerprint sensing device, according to an embodiment.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, descriptions of functions and constructions that are well known to one of ordinary skill in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Hereinafter, reference will now be made in detail to examples with reference to the accompanying drawings, wherein like reference numerals refer to like elements throughout.

Various alterations and modifications may be made to the examples. Here, the examples are not construed as limited to the disclosure and should be understood to include all changes, equivalents, and replacements within the idea and the technical scope of the disclosure.

Although the terms "first," "second," "third," etc., may be used herein to describe various elements, components, regions, layers, and/or sections, these elements, components, regions, layers, and/or sections, should not be limited by these terms. These terms are only used to distinguish one element, component, region, layer, or section, from another region, layer, or section. Thus, a first element, component, region, layer, or section, discussed below may be termed a second element, component, region, layer, or section, without departing from the scope of this disclosure.

When an element is referred to as being "on," "connected to," "coupled to," or "adjacent to," another element, the element may be directly on, connected to, coupled to, or adjacent to, the other element, or one or more other intervening elements may be present.

The terminology used herein is for the purpose of describing particular examples only and is not to be limiting of the examples. As used herein, the singular forms "a", "an", and "the" are intended to include the plural forms as well, unless the context clearly indicates otherwise. It will be further understood that the terms "include/comprise" and/or "have" when used in this specification, specify the presence of stated features, integers, steps, operations, elements, components, and/or combinations thereof, but do not preclude the presence or addition of one or more other features, numbers, steps, operations, elements, components, and/or groups thereof.

Unless otherwise defined, all terms, including technical terms and scientific terms, used herein have the same meaning as how they are generally understood by those of ordinary skill in the art to which the present disclosure pertains. Any term that is defined in a general dictionary shall be construed to have the same meaning in the context of the relevant art, and, unless otherwise defined explicitly, shall not be interpreted to have an idealistic or excessively formalistic meaning.

Identical or corresponding elements will be given the same reference numerals, regardless of the figure number, and any redundant description of the identical or corresponding elements will not be repeated. Throughout the description of the present disclosure, when describing a certain relevant conventional technology is determined to evade the point of the present disclosure, the pertinent detailed description will be omitted. Terms such as "first" and "second" can be used in describing various elements, but the above elements shall not be restricted to the above terms. The above terms are used only to distinguish one element from the other. In the accompanying drawings, some elements may be exaggerated, omitted or briefly illustrated, and the dimensions of the elements do not necessarily reflect the actual dimensions of these elements.

FIG. 1 is a block diagram schematically illustrating a fingerprint sensing device, according to an embodiment.

Referring to FIG. 1, the fingerprint sensing device 10, according to an embodiment, includes a sensor array 20, a sensing circuit 30, and a control circuit 40. The sensor array 20 provides an input region to accommodate a fingerprint of a user. A plurality of nodes may be disposed in the input region to measure capacitance in response to detection of the fingerprint of the user. The sensing circuit 30 detects changes in the capacitances from the nodes. The control circuit 40 generates fingerprint information using the changes in the capacitances detected by the sensing circuit 30 and compares the fingerprint information with pre-stored user authentication information to authenticate the user. The control circuit 40 transfers authentication information on whether or not the user is authenticated to a host 50. The host 50 may be an application processor (AP), a central processing unit (CPU), or hardware component of an electronic apparatus in which the fingerprint sensing device 10 is mounted. Alternatively, in another embodiment, the control circuit 40 generates the fingerprint information and transfers the generated fingerprint information to the host 50, and the host 50 compares the fingerprint information with the pre-stored user authentication information to authenticate the user.

The nodes in the sensor array 20 are defined as points at which driving electrodes and sensing electrodes intersect with each other. The nodes read, generate, or detect the changes in the capacitances that the fingerprint of the user produces as a finger of a user approaches the sensor array 20. Change amounts in the capacitances generated in the nodes are determined by distance differences between ridges of the fingerprint approaching the sensor array 20 and the nodes and valleys of the fingerprint and the nodes.

The sensing circuit 30 includes a driver 31 applying driving signals to the driving electrodes, an integration circuit 32 connected to the sensing electrodes and converting the changes in the capacitances generated in the nodes into voltage signals, and an analog-to-digital converter (ADC) 33. The driver 31 applies predetermined driving signals to the driving electrodes, and mutual capacitances are generated in the nodes included in the sensor array 20 by the driving signals. When the fingerprint approaches the sensor array 20, the mutual capacitances of each of the nodes are changed to be different from each other based on ridges and valleys of the fingerprint, and the integration circuit 32 senses these change amounts of capacitances or voltages.

The integration circuit 32 includes a charge pump circuit to detect the changes in the capacitances generated in the respective nodes of the sensor array 20. As an example, the integration circuit 32 detects the changes in the capacitances generated in the respective nodes of the sensor array 20 in a voltage signal form. Voltage signals generated by the integration circuit 32 are converted into sensing data having a digital signal form using an analog-to-digital converter in the integration sensor 32 and are transferred to the control circuit 40.

The control circuit 40 includes an operation logic, and generates fingerprint data using the sensing data transferred by the analog-to-digital converter 33. The fingerprint data includes information on a shape of the fingerprint approaching the sensor array 20. The control circuit 40 compares the fingerprint data with pre-stored reference fingerprint data to authenticate the user. In addition, the control circuit 40 adjusts an operation of the driver 31, such as timing or a voltage level of the driving signal applied by the driver 31. The control circuit 40 may be configured as one integrated circuit (IC) chip together with the sensing circuit 30.

The host 50 is connected to the fingerprint sensing device 10 to be able to communicate with the fingerprint sensing device 10, and is an application processor (AP) or a central processing unit (CPU) of an electronic device. The host 50 receives the fingerprint information generated by the control circuit 40 and proceeds with a user authentication process, or receives a user authentication result from the control circuit 40 and performs an operation appropriate for the user authentication result. In an embodiment, the sensing circuit 30 and the control circuit 40 are provided as one integrated circuit (IC) chip together with the host 50.

In an embodiment, the control circuit 40 defines sampling regions in the sensor array 20. The sampling regions may be regions separated from each other in the sensor array 20, and may be regions including only some of the nodes included in the sensor array 20. The control circuit 40 generates sensing data distributions from the sensing data obtained or extracted by the sensing circuit 30 in each of the sampling regions, and compares the sensing data distributions generated for each sampling region with predetermined reference distributions. The control circuit 40 determines that sampling regions in which the sensing data distributions corresponding to the reference distributions appear are effective contact regions.

In a case in which the fingerprint partially contacts the sensor array 20, some of the sampling regions may contact the fingerprint, and other sampling regions may not contact the fingerprint. In a case in which the number of sampling regions contacting the fingerprint is small, even if the sensing data is detected in all of the nodes included in the sensor array 30, the fingerprint information may not be normally generated. Therefore, the control circuit 40 compares the sensing data distributions obtained or extracted from in each sampling region with the reference distributions corresponding to sensing data distributions appearing when the fingerprint actually contacts the sampling regions. Based on the comparison, the control circuit 40 determines whether or not each sampling region effectively contacts the fingerprint to determine the number of sampling regions effectively contacting the fingerprint. Sampling regions, from which the sensing data distributions corresponding to the reference distributions are extracted, may be determined to be effective contact regions by the control circuit 40.

When the number of effective contact regions is a predetermined threshold number or more, the control circuit 40 applies the driving signals to all the nodes included in the sensor array 20 and generates the fingerprint information from the sensing data obtained or extracted by the sensing circuit 30. In contrast, when the number of regions determined to be the effective contact regions is less than the threshold number, the control circuit 40 switches the sensor array 30 into a standby mode. That is, the control circuit 40 may determine whether or not to generate the fingerprint information depending on the number of regions determined to be the effective contact regions among the sampling regions. Therefore, power consumed in the fingerprint sensing device 10 is effectively reduced, and operation errors of the fingerprint sensing device 10 is effectively reduced.

Figure 2:
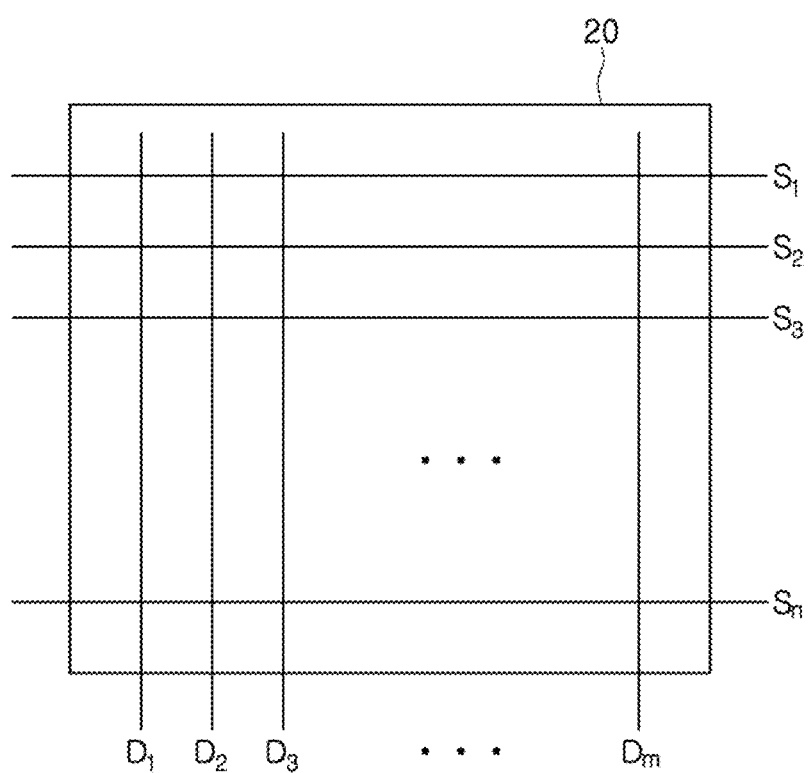
FIG. 2 is a circuit diagram schematically illustrating a sensor array included in the fingerprint sensing device, according to an embodiment.

FIG. 2 is a circuit diagram schematically illustrating a sensor array included in the fingerprint sensing device, according to an embodiment.

Referring to FIG. 2, the sensor array 20 according to an exemplary embodiment may include a driving electrodes D1 to Dm extended in a first direction (vertical direction of FIG. 2) and a sensing electrodes S1 to Sn extended in a second direction (horizontal direction of FIG. 2) different from the first direction. The driving electrodes D1 to Dm and the sensing electrodes S1 to Sn intersect with each other, and intersection points between the driving electrodes D1 to Dm and the sensing electrodes S1 to Sn are defined as a nodes at which the changes in the capacitances are generated by the fingerprint of the user.

The driving signals are applied to the driving electrodes D1 to Dm by the driver 31, and the sensing electrodes S1 to Sn are connected to the integration circuit 32. As an example, the driver 31 sequentially applies the driving signals to the driving electrodes D1 to Dm, and the integration circuit 32 detects the changes in the capacitances from the nodes at which the sensing electrodes S1 to Sn and the driving electrodes D1 to Dm to which the driving signals are applied.

Figure 3A:
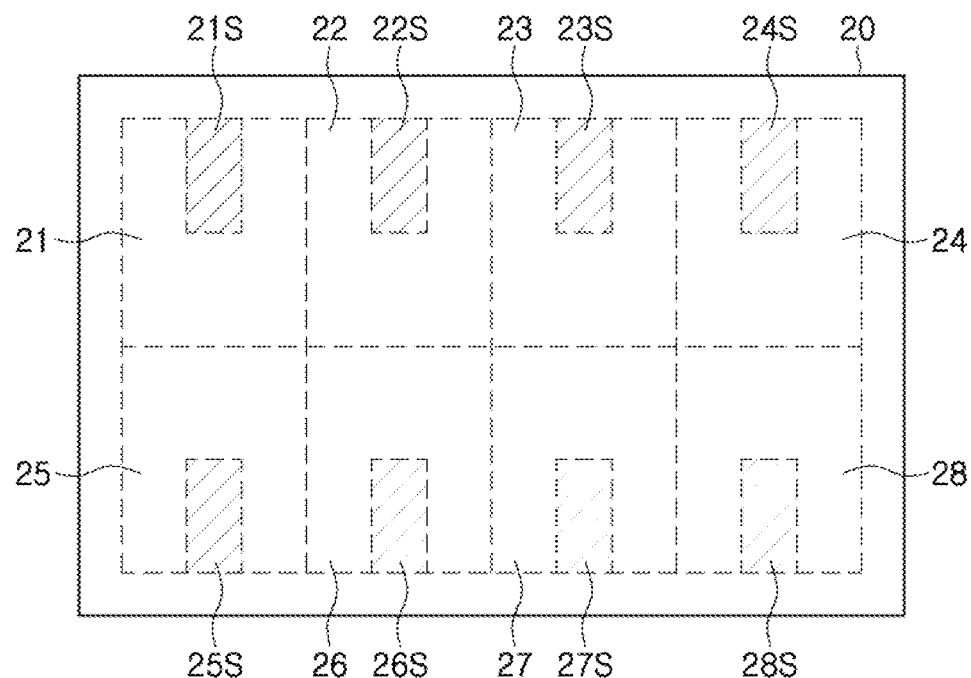
FIGS. 3A and 3B are views to describe a sampling region of the fingerprint sensing device, according to an embodiment.
Figure 3B:
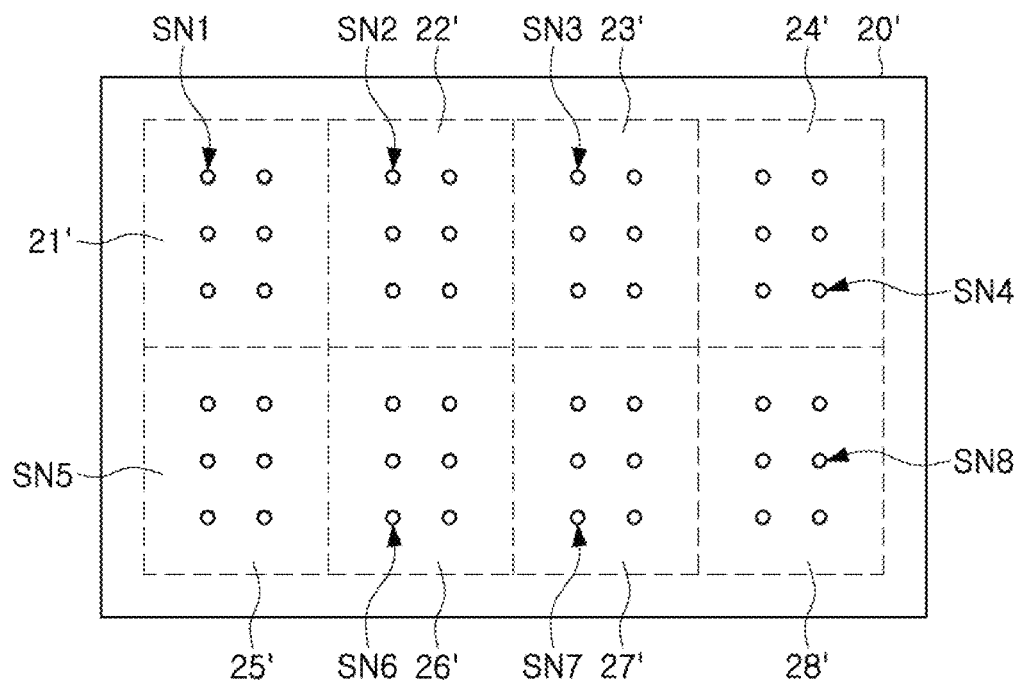

FIGS. 3A and 3B are views describing a sampling region of the fingerprint sensing device, according to an embodiment.

First referring to FIG. 3A, the input region in which the fingerprint of the user is accommodated in the sensor array 20 is virtually divided into sub-regions 21 to 28. Although a case in which the input region is virtually divided into eight sub-regions 21 to 28 is illustrated in FIG. 3A, the number of sub-regions 21 to 28 may be larger or smaller than eight. The number of sub-regions 21 to 28 and areas of the sub-regions 21 to 28 are determined by the control circuit 40.

When the sub-regions 21 to 28 are determined, the control circuit 40 sets sampling regions 21S to 28S in the respective sub-regions 21 to 28. The sampling regions 21S to 28S are defined or set in order to determine whether or not the fingerprint normally contacts the sensor array 20 before changes in the capacitances are detected from all of the nodes included in the sensor array 20. The control circuit 40 controls the sensing circuit 30 to sense the changes in the capacitances from the nodes included in the sampling regions 21S to 28S to extract the sensing data.

The control circuit 40 compares the sensing data distributions extracted from the sampling regions 21S to 28S with the reference distributions. The sensing data distributions are histogram distributions generated by calculating the number of nodes depending on the sensing data extracted in the respective sampling regions 21S to 28S. In addition, the reference distributions are sensing data distributions appearing when the fingerprint actually contacts the sensor array 20.

In a case in which a foreign material, other than the fingerprint, contacts the sensor array 20 or a fingerprint having a lot of moisture or a dried fingerprint contacts the sensor array 20, the sensing data distribution may tend to shift in a specific direction compared to the reference distribution or concentrate in a specific section. In one example, the control circuit 40 determines that the fingerprint is not effectively contacting the corresponding sampling regions 21S to 28S upon determining that the sensing data distributions extracted from the sampling regions 21S to 28S are different from the reference distribution or upon determining that the sensing data distributions extracted from the sampling regions 21S to 28S are excessively concentrated in a specific section. The control circuit 40 stops an operation of the sensor array 20, in response to the control circuit 40 has detected that, in the number of sampling regions 21S to 28S, the fingerprint is not normally contacting the sensor array 20 and/or that the fingerprint has not effectively contacted a predetermined threshold number or more. Therefore, power consumed in the fingerprint sensing device 10 is reduced.

In response to the control circuit 40 determining that the number of sensing data distributions corresponding to the reference distributions, among the sensing data distributions, of corresponding sampling regions 21S to 28S is equal to or greater than a predetermined threshold number, the control circuit 40 determines that the fingerprint normally contacts the sensor array. In this case, the control circuit 40 conducts a fingerprint sensing operation of the fingerprint sensing device 10.

As illustrated in FIG. 3B, the input region in which the fingerprint of the user is accommodated in the sensor array 20' is virtually divided into sub-regions 21' to 28'. In an embodiment illustrated in FIG. 3B, sampling nodes SN1 to SN8 are arbitrarily selected among nodes included in each of the sub-regions 21' to 28'. Although an example in which six sampling nodes SN1 to SN8 are selected in each of the sub-regions 21' and 28' is illustrated in FIG. 3B, the number of sampling nodes SN1 to SN8 selected in each of the sub-regions 21' and 28' may be adjusted to be less than or greater than six sampling nodes SN1 to SN8.

Similar to the embodiment of FIG. 3A, the control circuit 40 controls an operation of the sensing circuit 30 to sense changes in capacitances in, for instance, only the sampling nodes SN1 to SN8, and generates sensing data. The control circuit 40 compares sensing data distributions extracted from the respective sampling nodes SN1 to SN8 with preset reference distributions and generates a comparison result. Upon the comparison result indicative of the number of sensing data distributions corresponding to the reference distributions being at least a predetermined threshold number, the control circuit 40 determines that the fingerprint normally contacts the sensor array 20, and executes a fingerprint sensing operation of the fingerprint sensing device 10.

FIGS. 4 through 10 are views illustrating sensing data distributions to describe an operation of the fingerprint sensing device, according to an embodiment.

FIGS. 4 through 9 are views illustrating sensing data distributions detected by the control circuit 40 in response to various objects contacting the sensor array 20. In FIGS. 4 through 9, a horizontal axis indicates values of sensing data detected in nodes of the sensor array 20, and a vertical axis corresponds to the number of nodes having the respective sensing data values. In an embodiment, the sensing data is eight bits of digital data. Therefore, the sensing data has a value between 0 and 256.

Figure 4:
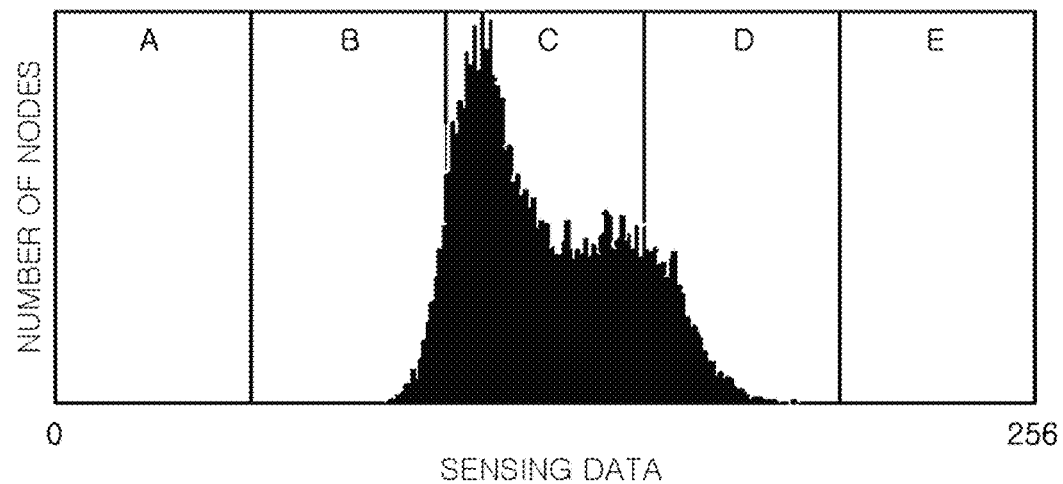
FIGS. 4 through 10 are views illustrating sensing data distributions to describe an operation of the fingerprint sensing device, according to an embodiment.

FIG. 4 illustrates a sensing data distribution appearing when the fingerprint normally contacts the sensor array 20. Referring to FIG. 4, the control circuit 40 extracts the sensing data distribution, which is concentrated in a third section C positioned at a center thereof, upon the fingerprint normally contacting the sensor array 20. Sensing data is not substantially detected in first and fifth sections A and E. The control circuit 40 sets a distribution of a trend as illustrated in FIG. 4 appearing upon the fingerprint normally contacting the sensor array 20 to a reference distribution. In response to an object contacting the sensor array 20, the control circuit 40 compares the sensing data distributions extracted from the sampling regions 21S to 28S or the sampling nodes SN1 to SN8 with the reference distribution as illustrated in FIG. 4, and calculates the number of effective contact regions from the comparison to determine whether or not the fingerprint effectively contacts the input region of the sensor array 20.

Figure 5:
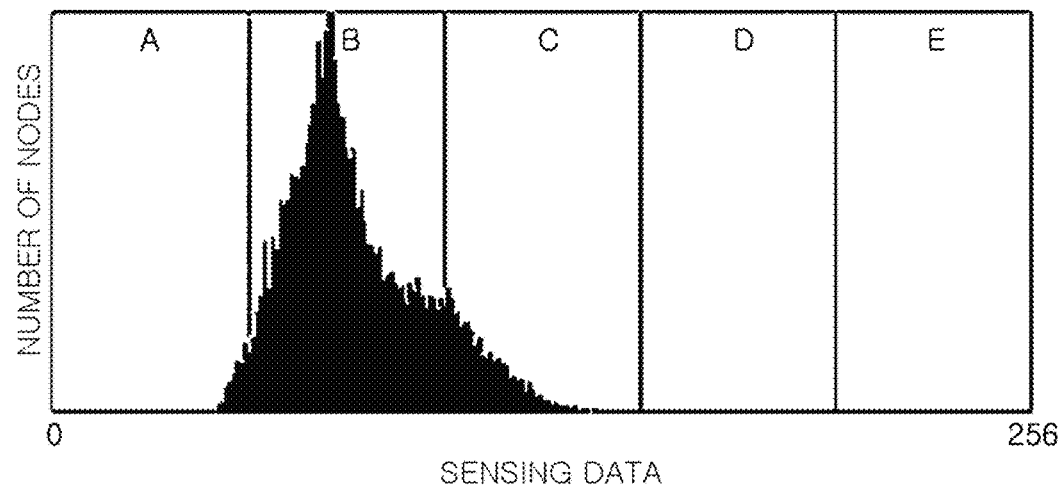

FIG. 5 illustrates a sensing data distribution appearing when a fingerprint having moisture contacts the sensor array 20. Referring to FIG. 5, when a wet fingerprint contacts the sensor array 20, the sensing data distribution concentrates in a second section B, and sensing data is not substantially detected in fourth and fifth sections D and E. When moisture is not excessive, a user authentication operation needs to be normally performed even in a case in which the wet fingerprint contacts the sensor array 20. Therefore, the control circuit 40 sets the sensing data distribution as illustrated in FIG. 5 to one of the reference distributions.

Figure 6:
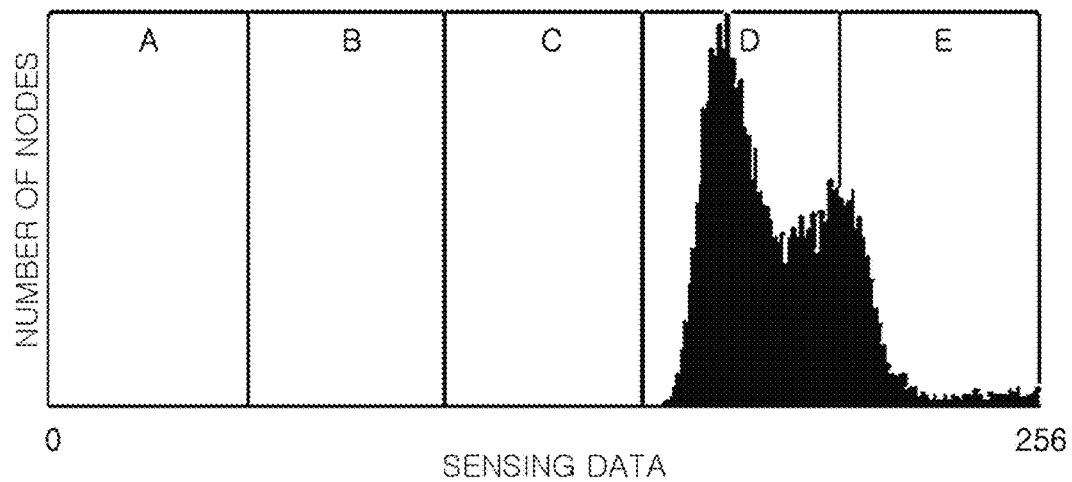

FIG. 6 illustrates a sensing data distribution appearing when a dry fingerprint contacts the sensor array 20. Referring to FIG. 6, when the dry fingerprint contacts the sensor array 20, the sensing data distribution concentrates in a fourth section D, and sensing data is not substantially detected in first and second sections A and B. In order to configure the fingerprint sensing device 10 to effectively normally authenticate the user depending on various fingerprint conditions of various users, the control circuit 40 performs a user authentication operation, even in a case in which the dry fingerprint contacts the sensor array 20. Therefore, the sensing data distribution, as illustrated in FIG. 6, may also be set to one of the reference distributions by the control circuit 40.

Figure 7:
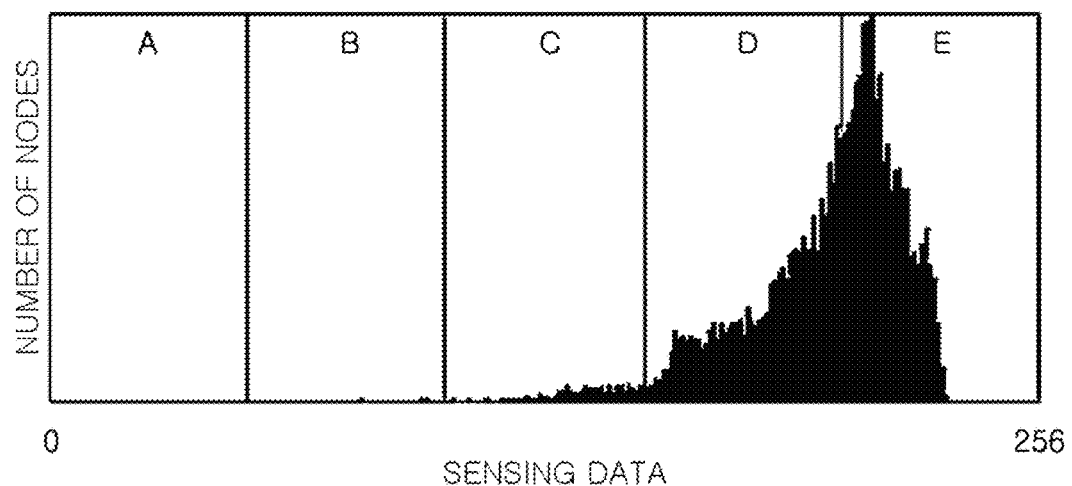

FIG. 7 illustrates a sensing data distribution appearing when foreign material contacts the sensor array 20. Referring to FIG. 7, the sensing data distribution concentrates in fourth and fifth sections D and E, and in particular, sensing data of the largest number of nodes is positioned in the fifth section E. In a case in which the sensing data distribution detected from the sensor array 20 concentrates on the fourth and fifth sections D and E, the control circuit 40 determines that the foreign material is contacting the sensor array 20 and stop an operation of the fingerprint sensing device 10 or switch the fingerprint sensing device 10 into a standby mode.

Figure 8:
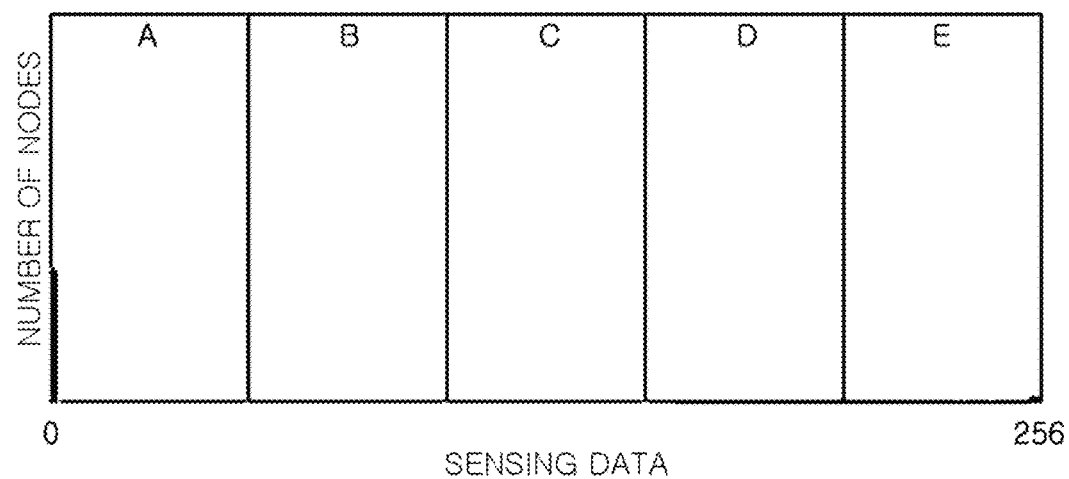

FIG. 8 illustrates sensing data distribution appearing when moisture, such as a drop of water, contacts the sensor array 20. When the moisture contacts the sensor array 20, some nodes having a minimum value or a maximum value of the sensing data, as illustrated in FIG. 8, appear, but sensing data distribution having a predetermined trend, as illustrated in FIGS. 4 through 7, may not appear. Therefore, in a case in which the sensing data distribution is excessively concentrated at the minimum value or the maximum value, the control circuit 40 determines that a normal fingerprint contact is not generated, and stops execution of a fingerprint sensing operation of the fingerprint sensing device 10.

Figure 9:
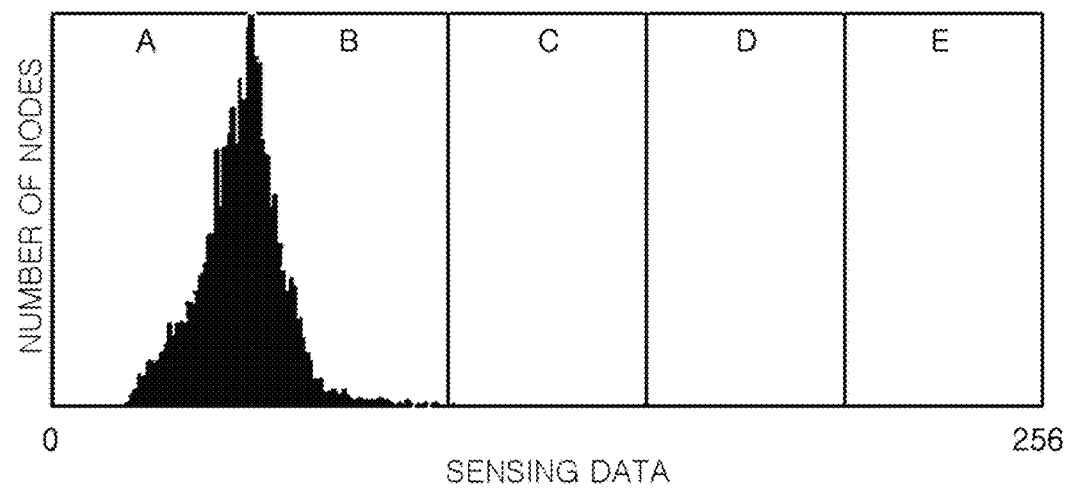

FIG. 9 illustrates sensing data distribution appearing when a fingerprint, having a very large amount of moisture, contacts the sensor array 20. In a case in which a large amount of moisture is present on the fingerprint, differences between ridges and valleys of the fingerprint may be reduced. Therefore, as illustrated in FIG. 9, the sensing data distribution concentrates in first and second sections A and B. It is possible that the sensing data distribution illustrated in FIG. 9 may be further concentrated in the first and second sections A and B, in contrast with the sensing data distribution illustrated in FIG. 5 and the sensing data distribution illustrated in FIG. 9. In addition, the sensing data distribution illustrated in FIG. 9 has a degree of scattering smaller than that of the sensing data distribution illustrated in FIG. 5.

In a case of the fingerprint having a very large amount of moisture, the moisture on the fingerprint may serve as an electrode. As a result, a large change in a capacitance is generated in a node adjacent to a valley filled with the moisture. As a result, because a difference of a change in a capacitance between nodes adjacent to the ridge and the valley is reduced, the sensing data may also have a small value, as illustrated in FIG. 9. In this case, it may be difficult for the control circuit 40 to authenticate the user using the sensing data. Therefore, the control circuit 40 may not set the sensing data distribution as illustrated in FIG. 9 to the reference distribution.

Hereinafter, an operation of the fingerprint sensing device 10, according to an embodiment, will be described in more detail with reference to FIG. 10 together with FIG. 3A.

When the changes in the capacitances are generated due to contact between the object and the sensor array 20, the control circuit 40 virtually divides a region of the sensor array 20 into the sub-regions 21 to 28, and sets the sampling regions 21S to 28S in the respective sub-regions 21 to 28. The respective sampling regions 21S to 28S include nodes.

The driver 31 supplies the driving signals to the sampling regions 21S to 28S, and the integration circuit 32 and the ADC 33 sense the changes in the capacitances from the nodes included in the sampling regions 21S to 28S to detect the sensing data. The sensing data is transferred to the control circuit 40, and the control circuit 40 extracts the sensing data distributions from the respective sampling regions 21S to 28S. As an example, the sensing data distributions re represented in a histogram form, as illustrated in FIG. 10, and the control circuit 40 extracts the sensing data distributions for the corresponding sampling regions 21S to 28S. That is, in an embodiment illustrated in FIG. 3A, the control circuit 40 obtains a total of eight sensing data distributions.

Figure 10:
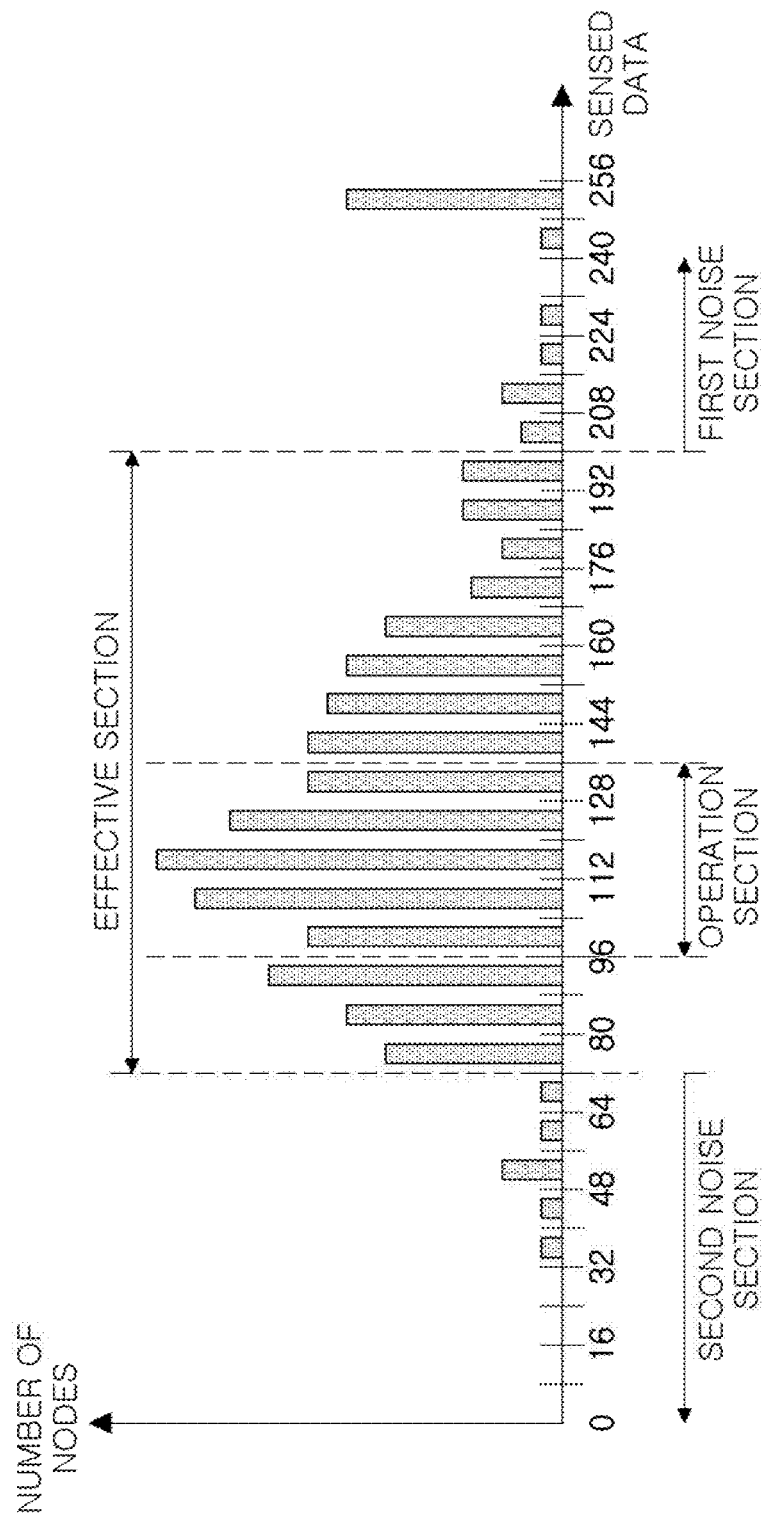

Referring to FIG. 10, the sensing data distributions extracted by the control circuit 40 from the sampling regions 21S to 28S are represented in the histogram form. However, a person of ordinary skill in the art will appreciate that other forms, such as scatter, line graph, pie chart, and area plot, may be used to represent the sensing data distributions. A horizontal axis indicates values of the sensing data, and a vertical axis indicates the number of nodes having the sensing data values. That is, in an embodiment illustrated in FIG. 10, the number of nodes having sensing data values of 112 or more to 120 or less may be defined to be the largest.

The control circuit 40 sets an effective section in the sensing data distribution. The effective section is a section remaining after noise sections are removed from the sensing data distribution. As an example, in a histogram representing the sensing data distribution, sections included in the top 5% and the bottom 5% are set to the noise sections. Ranges of the noise sections set by the control circuit 40 are changed depending on an operation environment of the fingerprint sensing device 10. Referring to FIG. 10, the control circuit 40 defines or sets a node corresponding to the top 5% and a node corresponding to the bottom 5% among all the nodes to a first noise section and a second noise section, respectively.

When the effective section is set, the control circuit 40 compares the sensing data distribution appearing in the effective section with the reference distribution. The reference distribution is at least one of reference distributions as described with reference to FIGS. 4 through 6. Because different sensing data distributions as illustrated in FIGS. 4 through 6 are detected depending on a state of the fingerprint of the user even in a case in which the fingerprint actually contacts the sensor array 20, the control circuit 40 compares the reference distributions in which several different environments are reflected with the sensing data distribution in the effective section.

When the sensing data distributions correspond to the reference distribution, as illustrated in FIG. 4, within the effective section, the control circuit 40 determines that the sampling regions 21S to 28S in which the corresponding sensing data distributions are extracted are the effective contact regions. The control circuit 40 compares sensing data distributions extracted in the respective sampling regions 21S to 28S with the reference distributions, respectively, and determines that the fingerprint normally contacts the sensor array 20 when the number of effective contact regions is at least a predetermined threshold number. The threshold number may be preset by the control circuit 40 or defined by the user. As an example, the threshold number is set to a value exceeding 60% of the total number of sampling regions 21S to 28S. That is, in FIG. 3A, the threshold number is set to a value between 5 and 8. Hereinafter, an operation of the fingerprint sensing device will be described with reference to FIGS. 11A through 11F.

FIGS. 11A through 11F are views provided in order to describe an operation of the fingerprint sensing device, according to an embodiment.

Figure 11A:
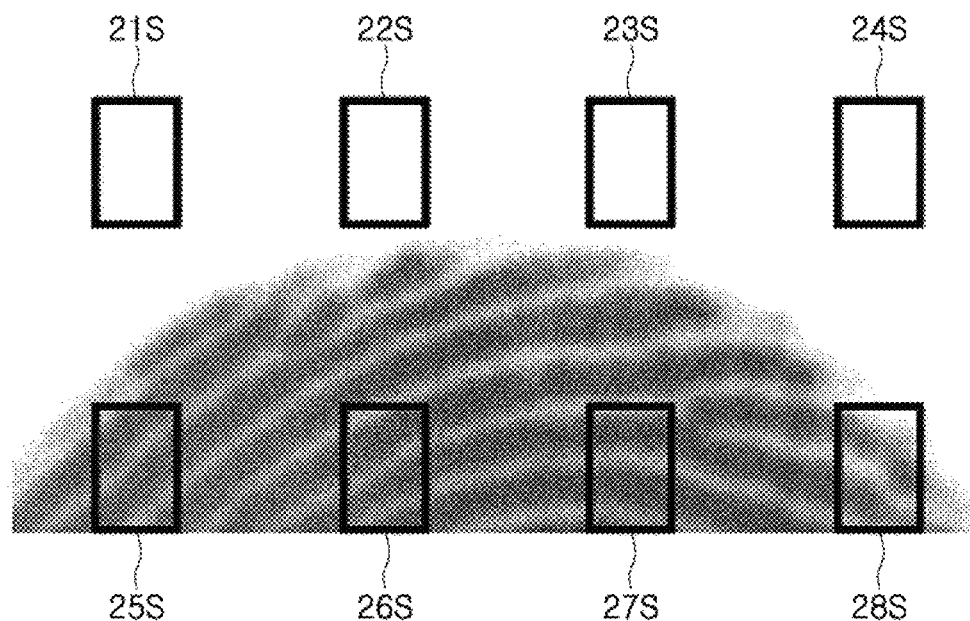
FIGS. 11A through 11F are views to describe an operation of the fingerprint sensing device, according to an embodiment.
Figure 11B:
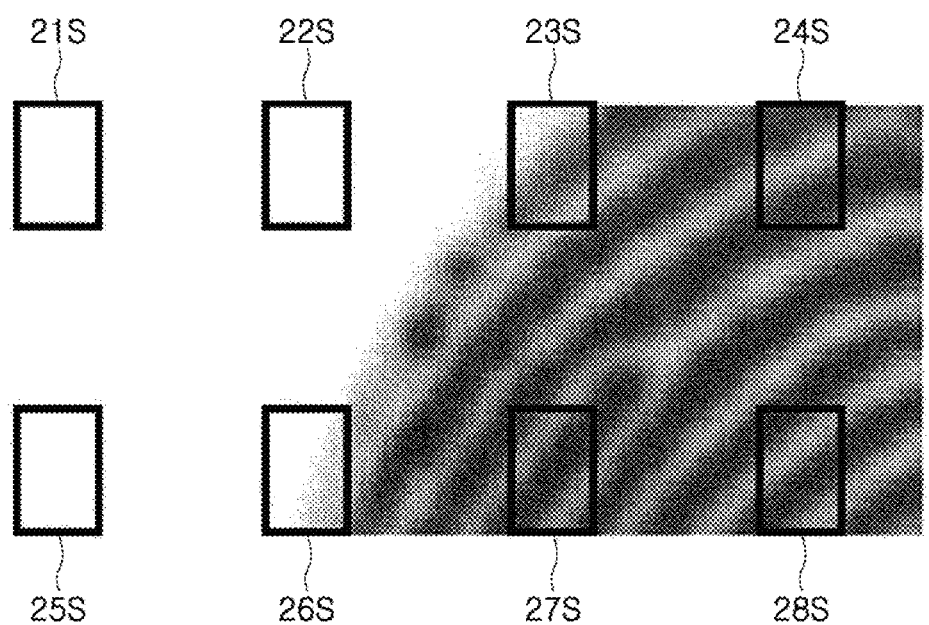

FIGS. 11A and 11B are views illustrating cases in which the fingerprint does not contact a sufficient area of the sensor array 20. Referring to FIG. 11A, in an example, the fingerprint does not contact first to fourth sampling regions 21S to 24S positioned at an upper portion of the sensor array 20, and only contacts fifth to eighth sampling regions 25S to 28S positioned at a lower portion of the sensor array 20. Therefore, the control circuit 40 extracts the sensing data distributions corresponding to the reference distributions as illustrated in FIG. 10 in only the fifth to eighth sampling regions 25S to 28S.

In an embodiment of FIG. 11B, the fingerprint does not contact the first, second, fifth, and sixth sampling regions 21S, 22S, 25S, and 26S positioned at the left of the sensor array 20, and only contacts the third, fourth, seventh, and eighth sampling regions 23S, 24S, 27S, and 28S positioned at the right of the sensor array 20. Therefore, in a case of an embodiment illustrated in FIG. 11B, the control circuit 40 extracts the sensing data distributions corresponding to the reference distributions exclusively in the third, fourth, seventh, and eighth sampling regions 23S, 24S, 27S, and 28S.

An embodiment illustrated in FIGS. 11A and 11B corresponds to a case in which the fingerprint does not contact an area sufficiently enough to generate the fingerprint data by the fingerprint sensing device 10. Therefore, the control circuit 40 controls the fingerprint sensing device 10 not to perform the fingerprint sensing operation in the case illustrated in FIGS. 11A and 11B. In other words, the fingerprint sensing device 10 does not sense a fingerprint in a case in which the number of sampling regions 21S to 28S in which the sensing data distributions corresponding to the reference distributions are extracted from is four.

Figure 11C:
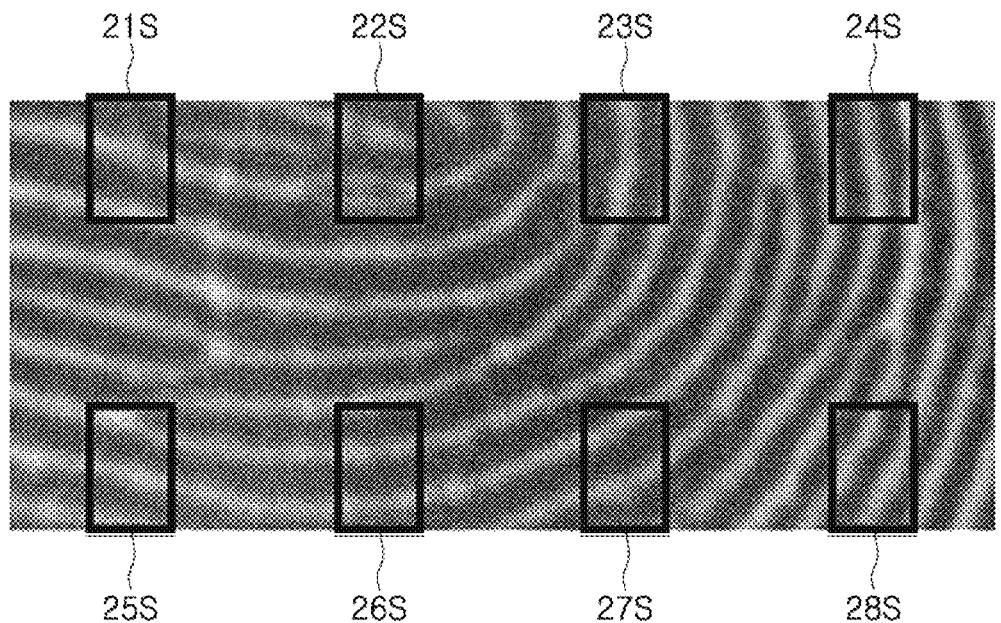
Figure 11D:
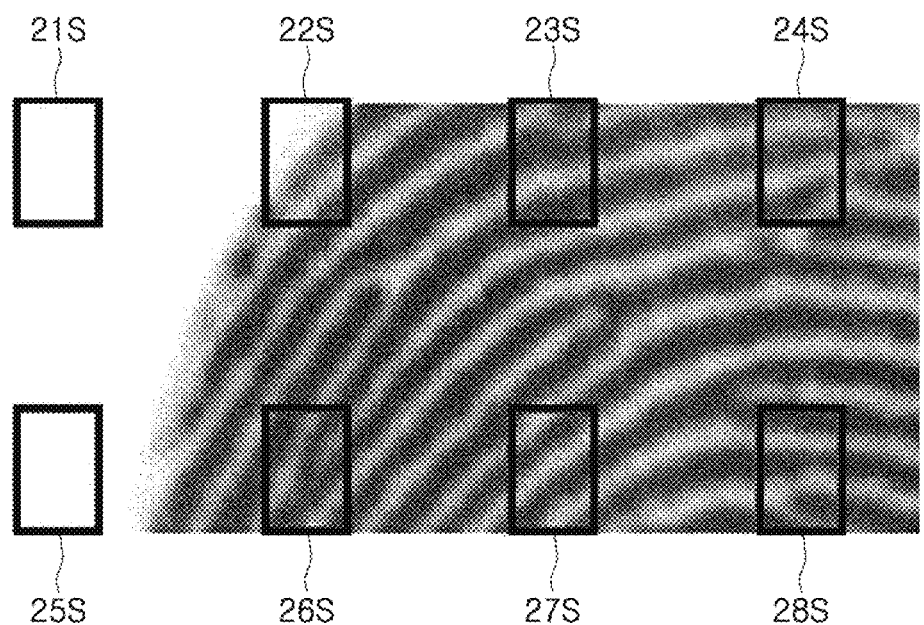

FIGS. 11C and 11D illustrate examples in which the fingerprint contacts a sufficient area of the sensor array 20. As illustrated in FIGS. 11C and 11D, when a fingerprint contact is generated, the control circuit 40 controls the fingerprint sensing device 10 to perform the fingerprint sensing operation to authenticate the user.

FIG. 11C illustrates a case in which the fingerprint contacts the entire sensor array 20. In an embodiment illustrated in FIG. 11C, the sensing data distributions corresponding to the reference distributions are detected in all of the sampling regions 21S to 28C. Therefore, the control circuit 40 controls the fingerprint sensing device 10 to perform the fingerprint sensing operation.

Furthermore, in an embodiment illustrated in FIG. 11D, the sensing data distributions corresponding to the reference distributions are detected in all of the sampling regions 22S to 24S and 26S to 28S other than the first and fifth sampling regions 21S and 25S. That is, the sensing data distributions corresponding to the reference distributions are detected in six sampling regions 22S to 24S and 26S to 28S of a total eight of sampling regions 21S to 28S. The control circuit 40 determines that the number of sampling regions 22S to 24S and 26S to 28S, in which the sensing data distributions corresponding to the reference distributions are extracted, that is, effective contact regions, is larger than the threshold number. The control circuit 40 controls the fingerprint sensing device 10 to perform the fingerprint sensing operation.

Figure 11E:
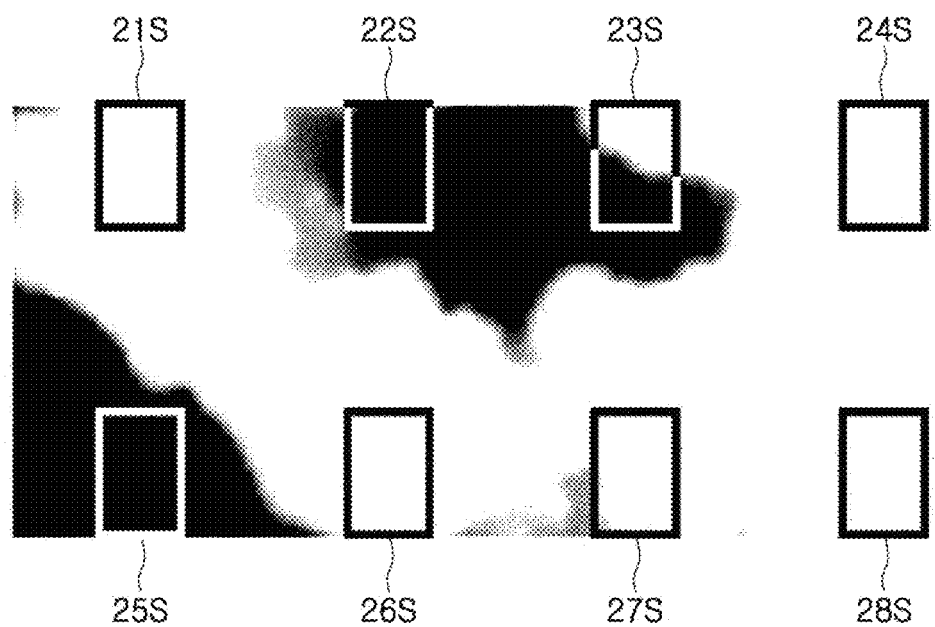
Figure 11F:
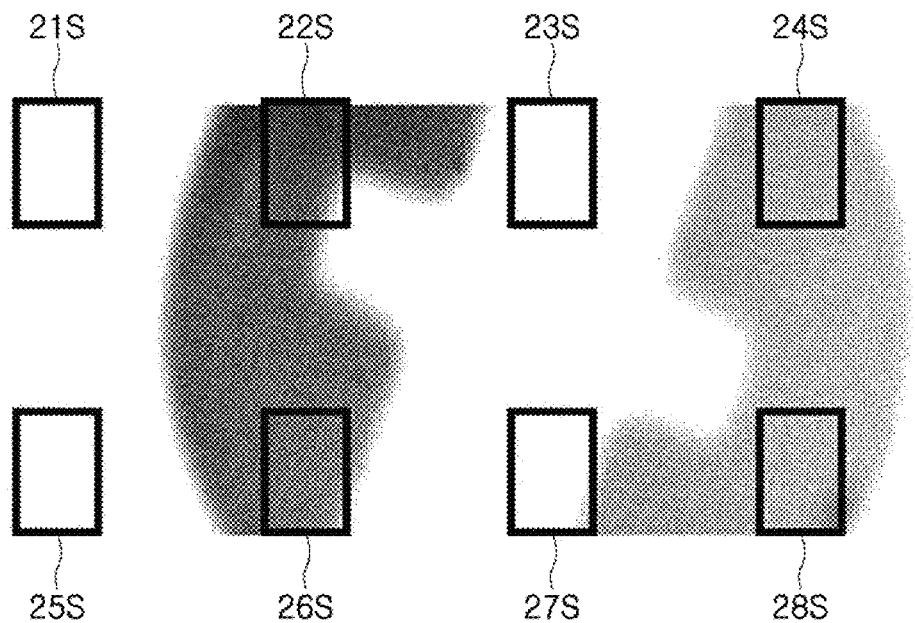

FIGS. 11E and 11F are views illustrating cases in which a foreign material contacts the sensor array 20. Referring to FIG. 11E, in an example in which a drop of water drops onto the sensor array 20, the control circuit 40 does not extract the sensing data distribution corresponding to the reference distribution. As described with reference to FIG. 8, in the example in which the drop of water drops onto the sensor array 20, only the nodes having the minimum value or the maximum value of the sensing data appear. Therefore, in the case illustrated in FIG. 11E, the control circuit 40 controls the fingerprint sensing device 10 not to perform the fingerprint sensing operation.

FIG. 11F illustrates a case in which foreign material, other than the drop of water, contacts the sensor array 20. As described with reference to FIG. 7, in the case in which the foreign material, other than the drop of water, contacts the sensor array 20, the control circuit 40 extracts a specific sensing data distribution. In a case in which the sensing data distribution extracted by the control circuit 40 is different from the reference distribution, the control circuit 40 compares the sensing data distribution with the reference distribution to control the fingerprint sensing device 10 not to perform the fingerprint sensing operation. However, the sensing data distributions extracted by the control circuit 40 from the respective sampling regions 21S to 28S may also correspond to the reference distributions, depending on a kind of foreign material. In this case, when the fingerprint sensing device 10 performs the fingerprint sensing operation, only power consumed by the fingerprint sensing device 10 is increased.

In an embodiment, in order to ensure that the foreign material does not trigger an undesired fingerprint sensing operation, the control circuit 40 additionally performs a process to determine whether or not the foreign material contacts the sensor array. Referring to FIG. 10, the control circuit 40 additionally sets a calculation section within the effective section. In an embodiment, the calculation section is included in the effective section, and is defined on the basis of a sensing data value of the largest number of nodes.

Referring to FIG. 10, the sensing data value of the largest number of nodes is defined in a range between 112 and 120. Therefore, the control circuit 40 defines the calculation section on the basis of the sensing data value between 112 and 120. Although the control circuit 40 sets a range between 96 and 136 to the calculation section, in an embodiment illustrated in FIG. 10, the calculation sections may also be set to be wider or narrower than this range.

The control circuit 40 calculates a ratio between the number of nodes included in the calculation section and the number of nodes included in the effective section. Further, the control circuit 40 sets a predetermined threshold ratio determine whether or not the foreign material contacts the sensor array from the ratio. The threshold ratio is determined depending on characteristics of the fingerprint sensing device 10. The control circuit 40 determines that the fingerprint contacts the sensor array 20 in response to a ratio between the number of nodes having sensing data values included in the calculation section and the number of nodes having sensing data values included in the effective section being smaller than the threshold ratio.

For example, in a case in which a total number of nodes is 144, the number of nodes having the sensing data values included in the effective section is 128, and the number of nodes having the sensing data values included in the calculation section is 80, the ratio is calculated to be 80/128, that is, 62.5%. When the threshold ratio preset in consideration of characteristics of the fingerprint sensing device 10 is 75%, the control circuit 40 determines that the fingerprint contacts the sensor array 20. Conversely, when the number of nodes having the sensing data values included in the calculation section is 100, the control circuit 40 determines that the foreign material contacts the sensor array 20.

When comparing FIG. 8, which illustrates the sensing data distribution extracted by the control circuit 40 when the foreign material contacts the sensor array, with FIGS. 4 through 6, which illustrate the sensing data distributions extracted by the control circuit 40 when the fingerprint contacts the sensor array, a degree of scattering of the sensing data distribution is smaller in FIG. 8 than in FIGS. 4 through 6. That is, in an example in which the foreign material, instead of the fingerprint, contacts the sensor array, sensing data values detected in the nodes may be further concentrated in a narrow section.

As a result, the ratio between the number of nodes included in the calculation section and the number of nodes included in the effective section is relatively larger in an example in which the foreign material contacts the sensor array than in an example in which the fingerprint contacts the sensor array. Therefore, the control circuit 40 determines that the fingerprint contacts the sensor array 20 in an example in which a ratio between the number of nodes having the sensing data values included in the calculation section and the number of nodes having the sensing data values included in the effective section is smaller than the threshold ratio.

Figure 12:
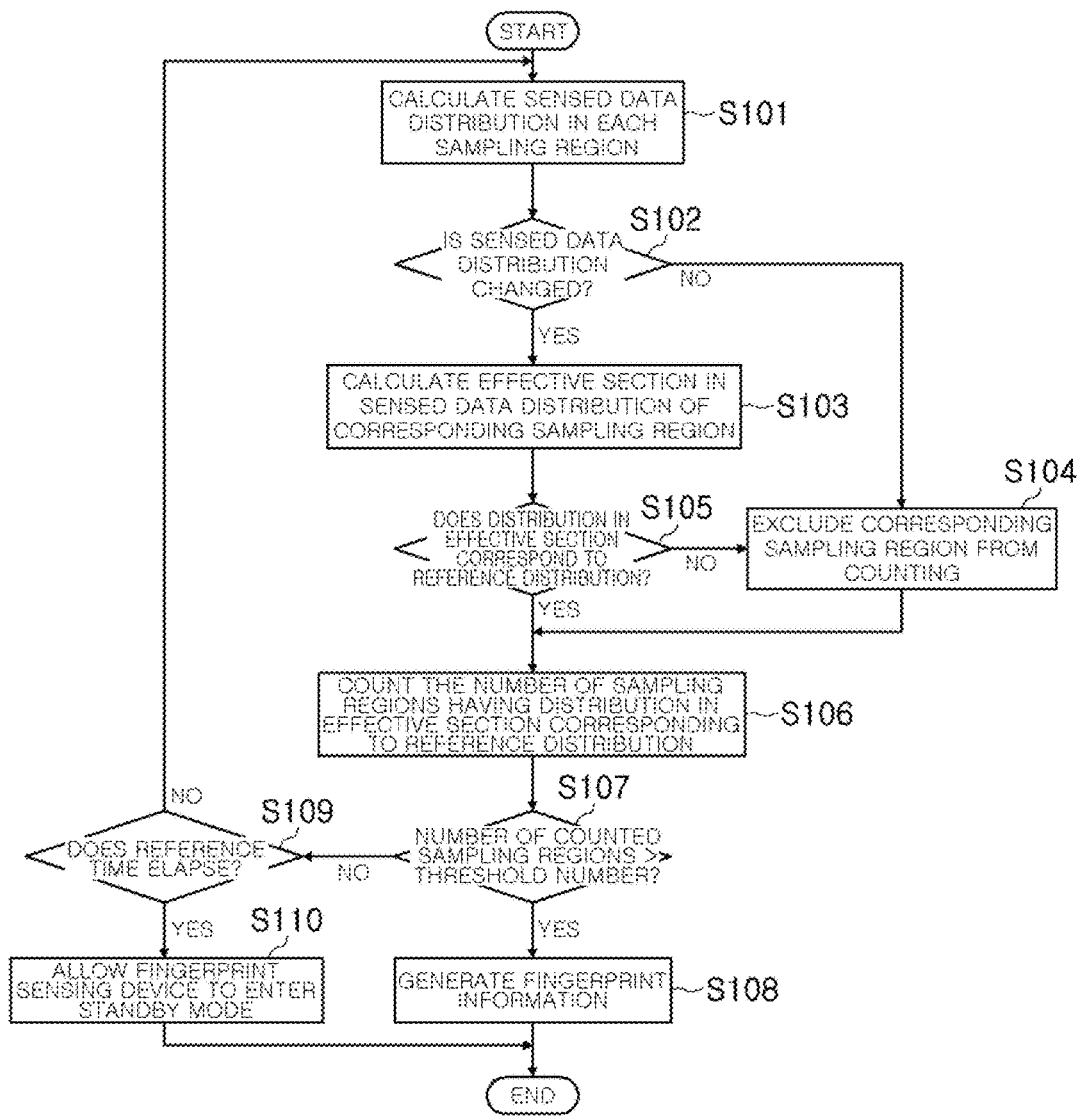
FIGS. 12 and 13 are flow charts describing an operation of the fingerprint sensing device, according to an embodiment.
Figure 13:
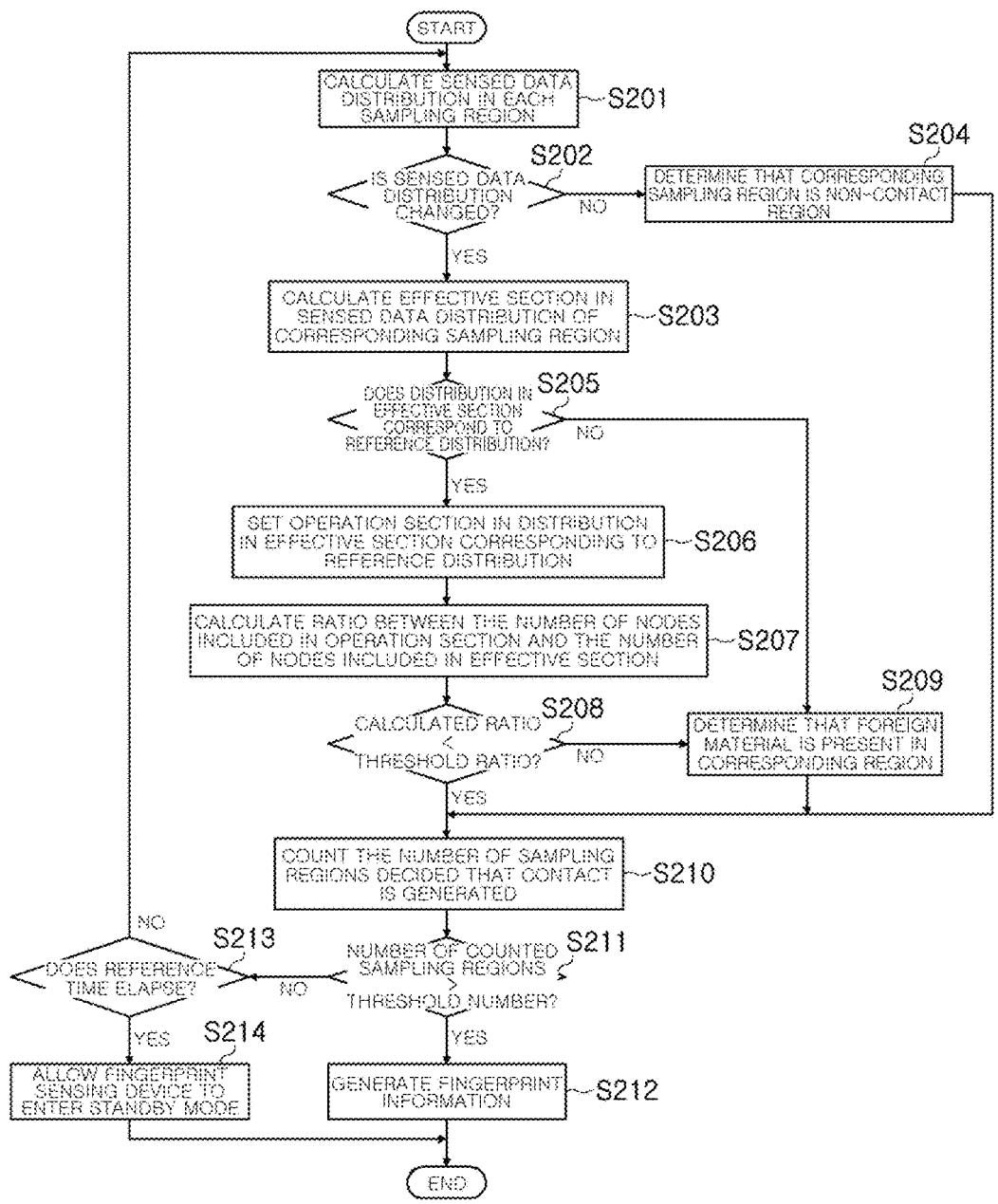

FIGS. 12 and 13 are flow charts provided in order to describe an operation of the fingerprint sensing device, according to an embodiment.

Referring to FIG. 12, the operation of the fingerprint sensing device 10, according to an embodiment, begins at operation S101, by generating the sensing data distributions in each of the sampling regions 21S to 28S defined in the sensor array 20. The sensing circuit 30 detects the changes in the capacitances from the nodes included in each of the sampling regions 21S to 28S to extract the sensing data. The control circuit 40 calculates the number of nodes depending on the sensing data values extracted by the sensing circuit 30 to generate the sensing data distribution. In an example, the control circuit 40 repeatedly generates the sensing data distribution per a predetermined period, and a method according to an embodiment of FIG. 12 is applied to an embodiment of FIG. 3B in which the sampling nodes SN1 to SN8, rather than the sampling regions 21S to 28S, are defined.

At operation S102, in response to the sensing data distribution being generated, the control circuit 40 compares a sensing data distribution generated in a current period with a sensing data distribution that was generated in a previous period and outputs a comparison result indicative thereof. In response to the comparison result indicating that the sensing data distribution is not changed, at operation S104, the control circuit 40 determines that an effective contact is not generated in the sampling regions 21S to 28S in which the corresponding sensing data distribution is extracted.

Conversely, in response to the control circuit 40 determining that the sensing data distribution has changed, at operation S103, the control circuit 40 calculates the effective section in the sensing data distribution decided to be changed. The control circuit 40 sets the effective section by considering the sections of the top 5% and the bottom 5% in the histogram distribution. The histogram distribution represents a distribution of the nodes depending on the sensing data values as the first and second noise sections. The control circuit 40 removes the first and second noise sections, as described with reference to FIG. 10.

In response to the effective section being set, at operation S105, the control circuit 40 determines whether or not a distribution in the effective section corresponds to a predetermined reference distribution. The reference distribution senses data distribution that may appear when the fingerprint contacts the sensor array 20 in various conditions and environments. The reference distribution is, for example, the histogram distribution as illustrated in FIGS. 4 through 6. At operation S105, in response to the control circuit 40 determining that the distribution in the effective section does not correspond to the reference distribution as a decision result, at operation S104, the control circuit 40 determines that effective contact is not generated in the sampling regions 21S to 28S in which the corresponding sensing data distribution is extracted.

Conversely, in response to the control circuit 40 determining that the distribution in the effective section corresponds to the reference distribution as the decision result in operation S105, at operation S106, the control circuit 40 defines the corresponding sampling regions 21S to 28S as the effective contact regions, and counts the number of effective contact regions. Therefore, sampling regions 21S to 28S that do not satisfy conditions as set forth in operation S102 and/or operation S105 may be excluded from the counting in operation S106. At operation S107, the control circuit 40 counts the number of sampling regions 21S to 28S satisfying the conditions in operations S102 and S105, and compares the counted number with a predetermined threshold number and outputs a determination result indicative thereof. The threshold number applied in operation S107 may have a value corresponding to 60% of the total number of sampling regions 21S to 28S. For example, in a case in which the total number of sampling regions 21S to 28S is 8, as illustrated in FIG. 3A, the threshold number may be 5.

In response to the control circuit 40 determining that the number of sampling regions 21S to 28S satisfying the conditions in operations S102 and S105 is larger than the threshold number as the determination result in operation S107, the control circuit 40 determines that the fingerprint contacts the sensor array 20 in an area enough to generate the fingerprint information, and, at operation S108, generates the fingerprint information. In order to generate the fingerprint information, the driver 31 applies the driving signals to the driving electrodes of the sensor array 20, and the integration circuit 32 detects the changes in the capacitances from the sensing electrodes intersecting with the driving electrodes to which the driving signals are applied. The ADC 33 converts the changes in the capacitances detected by the integration circuit 32 into digital values to generate the sensing data. The control circuit 40 generates the fingerprint information on the basis of the sensing data generated by the ADC 33, and compares the fingerprint information with the pre-stored user authentication information to authenticate the user.

Furthermore, in response to the number of sampling regions 21S to 28S satisfying operations S102 and S105 is the threshold number or less as the decision result in S107, at operation S109, the control circuit 40 determines whether or not a predetermined reference time elapses, and, at operation S110, enables the fingerprint sensing device 10 to enter a standby mode. The reference time applied in operation S109 is calculated from a point in time in which the fingerprint finally contacts the sensor array 20. When a contact is again generated on the sensor array 20 before the reference time elapses, the control circuit 40 returns to operation S101 to again perform the fingerprint sensing operation.

Referring to FIG. 13, the operation of the fingerprint sensing device 10, according to an embodiment, begins at operation S201, by calculating the sensing data distributions in each of the sampling regions 21S to 28S defined in the sensor array 20. The sensing circuit 30 detects the changes in the capacitances from the nodes included in each of the sampling regions 21S to 28S to extract the sensing data. Alternatively, the sensing circuit 30 also detects the changes in the capacitances from the respective sampling nodes SN1 to SN8 to extract the sensing data, as illustrated in FIG. 3B. The control circuit 40 calculates the number of nodes depending on the sensing data values extracted by the sensing circuit 30 to generate the sensing data distribution having the histogram form. In an example, the control circuit 40 repeatedly generates the sensing data distribution per a predetermined period.

At operation S202, in response to the sensing data distribution being generated, the control circuit 40 compares a sensing data distribution generated in a current period with a sensing data distribution that was generated in the previous period and outputs a comparison result indicative thereof. In response to determining that the sensing data distribution is not changed based on the comparison result, at operation S204, the control circuit 40 determines that the sampling regions 21S to 28S in which the corresponding sensing data distribution is extracted are non-contact regions in which an effective contact is not generated.

In response to determining that the sensing data distribution is changed as a decision result in operation S202, at operation S203, the control circuit 40 calculates the effective section in the corresponding sensing data distribution. The control circuit 40 calculates the effective section by setting the top 5% and the bottom 5% in the sensing data distribution having the histogram form to the noise sections and removing these sections, similar to operation S103 described above.

In response to the effective section being calculated, at operation S205, the control circuit 40 determines whether or not the sensing data distribution in the effective section corresponds to a predetermined reference distribution. When the control circuit 40 determines that the sensing data distribution in the effective section does not correspond to the reference distribution as a decision result, at operation S209, the control circuit 40 determines that the foreign material contacts the sampling regions 21S to 28S in which the corresponding sensing data distribution is extracted.

Conversely, when the control circuit 40 determines that the sensing data distribution in the effective section corresponds to the reference distribution as the decision result in operation S205, at operation S206, the control circuit 40 sets the calculation section in the effective section. The operation section sets on the basis of the sensing data value of the largest number of nodes. When the operation section is set, at operation S207, the control circuit 40 calculates the ratio between the number of nodes included in the calculation section and the number of nodes included in the effective section.

The control circuit 40 uses the ratio calculated in operation S207 to determine whether the fingerprint actually contacts the respective sampling regions 21S to 28S or the foreign material contacts the respective sampling regions 21S to 28S. At operation S208, the control circuit 40 compares the ratio calculated in operation S207 with a predetermined threshold ratio and outputs a comparison result indicative thereof. When the comparison result indicates that the ratio calculated in operation S207 is smaller than the threshold ratio, the control circuit 40 determines that the fingerprint actually contacts the corresponding sampling regions 21S to 28S. Conversely, when the comparison result indicates that the ratio calculated in operation S207 is larger than the threshold ratio, at operation S209, the control circuit 40 determines that the foreign material rather than the fingerprint contacts the corresponding sampling regions 21S to 28S.

At operation S210, the control circuit 40 counts the number of sampling regions 21S to 28S, which have determined that the contact is generated. In operation S210, the sampling regions 21S to 28S, which have decided that the contact is generated, may be regions satisfying all of the conditions in operations S202, S205, and S208.

When the number of sampling regions 21S to 28S counted in operation S210, that is, the number of sampling regions 21S to 28S satisfying all of the conditions in operations S202, S205, and S208, is larger than a predetermined threshold number, at operations S211 and S212, the control circuit 40 generates the fingerprint information from the sensor array 20. Also, when the number of sampling regions 21S to 28S satisfying all of the conditions in operations S202, S205, and S208 is the threshold number or less as the decision result in operation S211, at operation S213, the control circuit 40 determines whether or not a predetermined reference time elapses. At operation S214, the control circuit 40 enables the fingerprint sensing device 10 to enter the standby mode.

As described in FIGS. 12 and 13, the fingerprint sensing device 10, according to an embodiment, determines whether or not the fingerprint effectively contacts the predetermined number or more of regions of the sampling regions 21S to 28S to determine whether or not to generate the fingerprint information from the fingerprint sensing device 10. Therefore, a phenomenon is prevented in which the fingerprint sensing device 10 operates even when the foreign material contacts the sensor array or the fingerprint does not contact the sensor array enough to generate the fingerprint information. Furthermore, power consumed by the fingerprint sensing device 10 is significantly reduced.

Figure 14:
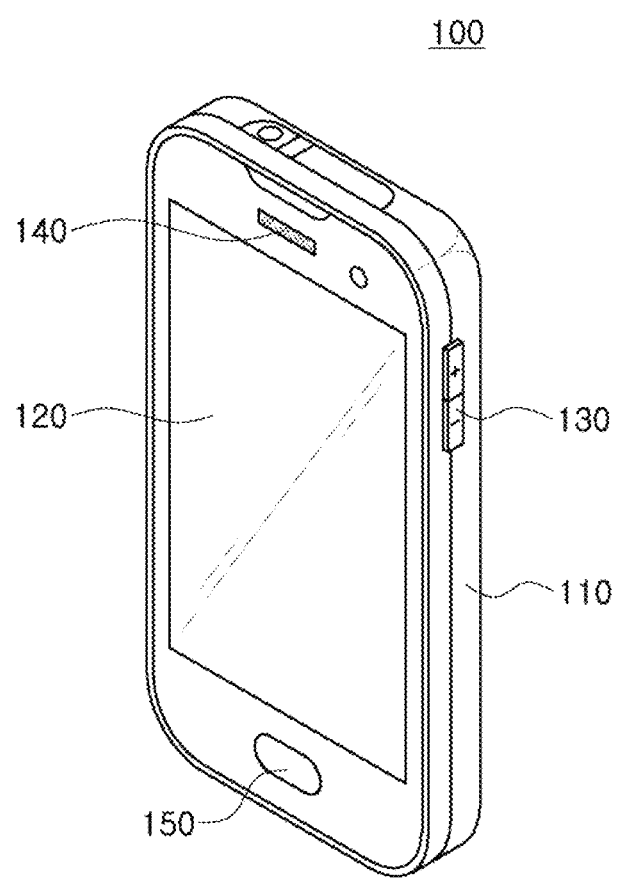
FIG. 14 is a perspective view illustrating an electronic device in which the fingerprint sensing device is used, according to an embodiment.

FIG. 14 is a perspective view illustrating an electronic device in which the fingerprint sensing device, according to an embodiment, may be used.

Referring to FIG. 14, the electronic device 100, according to an embodiment includes a housing 110, a display 120, a key input unit 130, an audio output unit 140, and a fingerprint sensing device 150. Although the electronic device 100, according to an embodiment has been illustrated as a smartphone in FIG. 14, the electronic device may include a general electronic device such as a desktop computer, a television, a refrigerator, a washing machine, a video game console, or the like, as well as a mobile apparatus such as a tablet personal computer (PC), or a laptop computer.

In an embodiment illustrated in FIG. 14, the fingerprint sensing device 150 included in the electronic device 100 is the fingerprint sensing device according to the various embodiments described with reference to FIGS. 1 through 13. That is, the fingerprint sensing device 150 includes the sensor array providing an input region to accommodate a fingerprint of a user and a controller integrated circuit (IC)

connected to the sensor array to generate fingerprint information and authenticating the user. The controller IC may be linked to a separate memory or a memory included in the electronic device 100 to manage user authentication information. The controller IC may be an application processor (AP) of the electronic device 100 or an IC chip provided separately from the application processor.

In a case in which contact is generated on the input region, the controller IC extracts sensing data distributions from sensing data detected in a sampling regions defined in the input region, and compares the sensing data distributions with reference distributions. When the number of sampling regions, in which the sensing data distributions corresponding to the reference distributions are extracted, is a predetermined threshold number or more as a comparison result, the fingerprint sensing device 150 determines that an object contacting the input region is an effective fingerprint, and generates the fingerprint information.

As set forth above, the fingerprint sensing device, according to an embodiment, compares the sensing data distributions extracted from the sampling regions defined in some of regions of the sensor array with the reference distribution to decide whether or not the fingerprint or the foreign material is contacting the sensor array and determine whether or not the fingerprint information is generated. In accordance with at least one of the many benefits associated with the fingerprint sensing device, power consumption is significantly reduced.

The sensors, arrays, circuits, drivers, and other components illustrated and described with respect to FIGS. 1-11 and 14 that perform the operations described herein with respect to FIGS. 12-13 are implemented by hardware components. Examples of hardware components include controllers, sensors, generators, drivers, and any other electronic components known to one of ordinary skill in the art. In one example, the hardware components are implemented by one or more processors or computers. A processor or computer is implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices known to one of ordinary skill in the art that is capable of responding to and executing instructions in a defined manner to achieve a desired result. In one example, a processor or computer includes, or is connected to, one or more memories storing instructions or software that are executed by the processor or computer. Hardware components implemented by a processor or computer execute instructions or software, such as an operating system (OS) and one or more software applications that run on the OS, to perform the operations described herein with respect to FIGS. 1-11 and 14. The hardware components also access, manipulate, process, create, and store data in response to execution of the instructions or software. For simplicity, the singular term "processor" or "computer" may be used in the description of the examples described herein, but in other examples multiple processors or computers are used, or a processor or computer includes multiple processing elements, or multiple types of processing elements, or both. In one example, a hardware component includes multiple processors, and in another example, a hardware component includes a processor and a controller. A hardware component has any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 12-13 that perform the operations described herein with respect to FIGS. 1-11 and 14 are performed by a processor or a computer as described above executing instructions or software to perform the operations described herein.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any device known to one of ordinary skill in the art that is capable of storing the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the processor or computer.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A fingerprint sensing device comprising:
a sensing circuit configured to extract sensing data from nodes included in each of sampling regions of a sensor array; and
a control circuit configured to calculate a number of the nodes based on the extracted sensing data to produce sensing data distributions for each of the sampling regions and compare the sensing data distributions with reference distributions, configured to determine that the sampling regions from which the sensing data distributions corresponding to the reference distributions are extracted are effective contact regions, and configured to generate fingerprint information from the sensor array when a number of effective contact regions is greater than or equal to a threshold,
wherein the control circuit sets an effective section in the sensing data distribution and compares the sensing data distribution in the effective section with the reference distributions, and wherein the control circuit defines a section, except for a bottom 5% and a top 5% in the sensing data distribution, to the effective section.

2. The fingerprint sensing device of claim 1, wherein the control circuit defines separate regions in the sensor array as the sampling regions.

3. The fingerprint sensing device of claim 1, wherein the control circuit stops operation of the fingerprint sensing device or switches to a standby mode upon determination that the sensing data distribution indicates an excess moisture condition based on a concentration of sensing data extracted from the nodes at a minimum value or maximum value.

4. The fingerprint sensing device of claim 1, wherein the reference distribution is the sensing data distribution obtained in response to a fingerprint contacting the sensor array.

5. The fingerprint sensing device of claim 1, wherein the sensing circuit and the control circuit are provided as an integrated circuit (IC) chip.

6. The fingerprint sensing device of claim 1, wherein the sensing circuit comprises an integration circuit detecting changes in capacitances from the nodes to generate analog signals and an analog-to-digital converter (ADC) converting the analog signals into digital signals.

7. The fingerprint sensing device of claim 1, wherein the nodes are intersection points between first electrodes extended in a first direction and second electrodes extended in a second direction, different from the first direction.

8. The fingerprint sensing device of claim 1, wherein the control circuit generates the sensing data distribution as a histogram distribution representing the number of the nodes with respect to the sensing data.

9. The fingerprint sensing device of claim 1,
wherein the control circuit generates the fingerprint information upon the number of sampling regions decided to be the effective contact regions being 60% or more of a total number of sampling regions.

10. A fingerprint sensing device comprising:
a sensing circuit configured to extract sensing data from nodes included in each of sampling regions of a sensor array; and
a control circuit configured to calculate a number of the nodes based on the extracted sensing data to produce sensing data distributions for each of the sampling regions and compare the sensing data distributions with reference distributions, configured to determine that the sampling regions from which the sensing data distributions corresponding to the reference distributions are extracted are effective contact regions, and configured to generate fingerprint information from the sensor array when a number of effective contact regions is greater than or equal to a threshold,
wherein the control circuit sets an effective section in the sensing data distribution and compares the sensing data distributions in the effective section with the reference distribution, and
wherein the control circuit sets a calculation section based on the sensing data obtained from a largest number of nodes among the nodes, and calculates a number of sampling regions in which a ratio between the number of nodes included in the calculation section and the number of nodes included in the effective section is equal to or less than a threshold ratio.

11. The fingerprint sensing device of claim 10, wherein the control circuit generates the fingerprint information in response to the number of sampling regions in which the ratio between the number of nodes included in the calculation section and the number of nodes included in the effective section is equal to or less than the threshold ratio or is greater than a threshold number.

12. The fingerprint sensing device of claim 10, wherein the control circuit determines that the sampling regions in which the ratio between the number of nodes included in the calculation section and the number of nodes included in the effective section is greater than the threshold ratio and are regions in which a foreign material is present.

13. An electronic device, comprising:
a memory configured to store user authentication information;
a sensor array configured to provide an input region to detect a fingerprint of a user; and
a controller integrated circuit (IC) configured to obtain sensing data distributions in each of sampling regions defined in the input region, choose a section, except for a bottom 5% and a top 5% in the sensing data distribution, as an effective section, and control an operation of a fingerprint sensor by comparing the effective section with reference distributions,
wherein the controller IC compares a fingerprint information with user authentication information to authenticate the user, when the number of sampling regions in which the sensing data distributions having the effective section corresponding to the reference distributions is equal to or greater than a threshold number.

14. The electronic device of claim 13, wherein the controller IC sets an effective section in the sensing data distribution obtained in each of the sampling regions and compares the sensing data distribution in the effective section with the reference distributions.

15. The electronic device of claim 13, wherein the controller IC switches a fingerprint sensing device into a standby mode upon the number of sampling regions, in which the sensing data distributions corresponding to the reference distributions are obtained, is less than the threshold number.

* * * * *